United States Patent
Bradley et al.

(10) Patent No.: US 8,682,682 B1
(45) Date of Patent: *Mar. 25, 2014

(54) SYSTEMS AND METHODS FOR GENERATING A MODEL FOR HOME VALUE SCORING

(75) Inventors: Michael G. Bradley, Potomac, MD (US); J. Douglas Gordon, Arlington, VA (US); Pamela W. Sims, Arlington, VA (US); Douglas A. McManus, Bethesda, MD (US); Morgan C. Snyder, Clifton, VA (US)

(73) Assignee: Freddie Mac, McLean, VA (US)

( * ) Notice: Subject to any disclaimer, the term of this patent is extended or adjusted under 35 U.S.C. 154(b) by 237 days.

This patent is subject to a terminal disclaimer.

(21) Appl. No.: 13/218,725

(22) Filed: Aug. 26, 2011

Related U.S. Application Data

(63) Continuation of application No. 11/976,886, filed on Oct. 29, 2007, now Pat. No. 8,010,377, which is a continuation of application No. 10/095,006, filed on Mar. 12, 2002, now Pat. No. 7,289,965.

(60) Provisional application No. 60/311,125, filed on Aug. 10, 2001.

(51) Int. Cl.
*G06Q 10/00* (2012.01)

(52) U.S. Cl.
USPC .............................. 705/1.1; 705/35; 705/306

(58) Field of Classification Search
USPC .......................................... 705/1.1, 35, 306
See application file for complete search history.

(56) References Cited

U.S. PATENT DOCUMENTS 5,857,174 A    1/1999  Dugan
6,088,686 A    7/2000  Walker et al.
6,401,070 B1   6/2002  McManus et al.
7,451,095 B1   11/2008 Bradley et al.
7,797,166 B1   9/2010  Bradley et al.
7,835,919 B1   11/2010 Bradley et al.
2002/0161609 A1 10/2002 Zizzamia et al.

FOREIGN PATENT DOCUMENTS

JP    04052198 A    2/1992

OTHER PUBLICATIONS

Zizzamia et al.; U.S. Appl. No. 60/242,633, filed Oct. 23, 2010.
Cornwell, Ted; Ocwen Puts Vendor Management on New Site; Oct. 16, 2000; National Mortgage News; vol. 25, Issue 4, p. 8.
Software Prototyping, Sep. 22, 1998, printed from http://nas.cl.uh.edu/helm/swen523, PROTO_HTML/index.htm.

(Continued)

*Primary Examiner* — Naresh Vig
(74) *Attorney, Agent, or Firm* — Finnegan, Henderson, Farabow, Garrett & Dunner, L.L.P.

(57) ABSTRACT

A method, system, and non-transitory computer-readable storage medium are disclosed that determine a likelihood that an appraisal for a property is accurate. The method may include receiving borrower information and property information. The method may further including calculating, based on the received borrower information and property information, a score for the appraisal of the property, the score providing an indication of the accuracy of the appraisal. The method may further include establishing a plurality of ranges within which the score may fall, each of the ranges providing a relative indication of the accuracy of the appraisal. The method may further include analyzing the score to determine within which of the plurality of ranges the score falls. The method may further include determining, based on the analysis of within which range the score falls, whether to request further review of the appraisal.

21 Claims, 14 Drawing Sheets

(56) References Cited

OTHER PUBLICATIONS

Vinterbo et al., A Genetic Algorithm to Select Variables in Logistic Regression, 1999.
David Nichols, Sample Letter, University of Georgia, Dec. 12, 1998.
Lewis, Edward, "An Introduction to Credit Scoring," Library of Congress Catalog No. 90-92258, pp. 1-169, 1994, San Rafael, CA.
http://www.myfico.com/myfico/CreditCentral/ScoringWorks.asp, pp. 1-2, Oct. 28, 2002.
http://www.myfico.com, p. 1, Oct. 28, 2002.
American Banker-Bond Buyer, a division of Thomson Publishing Corporation, vol. 9, No. 1, p. 35, Jan. 2002/Feb. 2002.
Edward M. Lewis, An Introduction to Credit Scoring, pp. 1-169 (1994).
Mar Dum, Why CASA for Fitch? American Banker-Bond Buyer, Thomson Publishing Corporation, vol. 9, No. 1, p. 36, Jan. 2002/Feb. 2002.
U.S. Appl. No. 10/094,806, entitled "Systems and Methods for Home Value Scoring," filed Mar. 12, 2002.
U.S. Appl. No. 10/283,339, entitled "Systems and Methods for Income Scoring," filed Oct. 30, 2002.
U.S. Appl. No. 10/283,338, entitled "Systems and Methods for Generating a Model for Income Scoring," filed Oct. 30, 2002.

| |
|---|
| Loan/Reference Number |
| Requestor (i.e., the lender) |
| Street Address of the property |
| City |
| State |
| Zip Code (5 digit) |
| Stated value of the property |
| Total loan amount (first lien plus additional) to calculate total loan-to-value (LTV). If unknown, enter '0' for all amounts |
| Condo Flag ( a flag indicating whether the loan is for a condominium) |
| Purpose of loan (P=purchase, R=rate/term refinance (refi), C=cash out finance, H=home improvement, D=debt consolidation, O=other |
| Credit Source (1 for lender, 2 for Credit Repository) |
| Borrower's Credit Score(s) |

FIG. 6

| |
|---|
| Borrower's credit score(s) |
| Zip code +4 extention, if available, for a property |
| Combined Point Value is a home value estimate, such as an estimate from a database containing property estimates in a region, such as within a ZIP code, county, or state. |
| Combined Sigma is a standard deviation for home value estimates derived from a Database containing property estimates in a region, such as within a Zip code, county, or state. |
| Zone Point Value refers to a point value assigned to the median house price based on Zip code or Zip+4 code |

FIG. 7

Sample Web Page Request

Enter the address and click "Submit" to retrieve an HVSCORE report.

---
Top of Form 1
---

| | |
|---|---|
| Borrower First Name: | |
| Borrower Last Name: | [_____] |
| Loan/Ref #: | |
| Requestor: | [_____] |
| Street: | [_____] |
| Unit #: | [_____] (optional) |
| City: | [_____] |
| State: | [AK ▼] |
| Zip Code: | [____] |

Current Purchase/Refinance/Credit Information:

Current Appr/Value Estimate: [____]   First Lien Loan Amount: [____]
(if unknown, enter '0' for all amounts)
Second Lien Loan Amount: [____]   Financial MI Amount: [____]

Property Type: [1] Single Family Residence  [2] Condo
[3] Two-Four Unit

Loan Purpose: [1] Purchase  [2] Cash-out Refinance
[3] Non cash-out Refinance  [4] Home Improvement
[5] Debt Consolidation
[6] Other

Credit Source: [1] Lender  [2] Credit Repository

Credit Score: [____]

[Submit] [Reset values]

---
Bottom of Form 1
---

Home

FIG. 8

| 1. | HV SCORE = 696.7000 \*** VARIABLES ARE MULTIPLIED BY **\ |
|---|---|
| 2. | + 1.1513*CS         \** parameters or weights **/ |
| 3. | + 0.7011*CS660 |
| 4. | - 1.4889*CS760 |
| 5. | + 816.3115*MCRED |
| 6. | - 11.0280*LTV |
| 7. | + 1.4715*LTV71 |
| 8. | + 1.1859*LTV81 |
| 9. | - 4.2848*LTV91 |
| 10. | -53.3393*CONDO |
| 11. | -34.6074*VALSIGU |
| 12. | +34.6074*(NOTBOTH)*VSU2 |
| 13. | -13.7633*VALSIGD |
| 14. | +108.19*PUR |
| 15. | +67.90*NCO |
| 16. | +0*CO |
| 17. | +0*HIL |
| 18. | +0*DC |
| 19. | +0*OTH |
| 20. | -79.06*ZONDIFU |
| 21. | +114.55*ZONDIFD |
| 22. | |
| 23. | If HVScore < 300 then HVScore = 300       \** scaling score to a range **\ |
| 24. | If HVScore > 900 then HVScore = 900 |
| 25. | |
| 26. | If (HVE value) > .90*(stated value) then HV Score = max(HVScore,600) |

FIG. 9

| LOAN NUMBER | 1ST APPRAISAL | VERIFIED APPRAISAL | OUT-COME | LTV | P FACTOR | CREDIT SCORE | CONDO FLAG | CASH OUT REFIN-ANCE |
|---|---|---|---|---|---|---|---|---|
| 1 | $200,000 | $205,000 | 0 | 60 | -1.4 | 775 | 0 | 0 |
| 2 | $150,000 | $100,000 | 1 | 110 | 4.0 | 400 | 0 | 0 |
| 3 | $175,000 | $125,000 | 1 | 120 | 4.5 | 450 | 0 | 1 |
| 4 | $150,000 | $50,000 | 0 | 65 | -1.9 | 800 | 0 | 0 |
| ... | | | | | | | | |
| N$^{th}$ Loan | $75,000 | $75,000 | 0 | 70 | -1.85 | 790 | 0 | 0 |

FIG. 13

SYSTEMS AND METHODS FOR GENERATING A MODEL FOR HOME VALUE SCORING

CROSS REFERENCE TO RELATED APPLICATION

This is a continuation of U.S. application Ser. No. 11/976,886, filed Oct. 29, 2007 now U.S. Pat. No. 8,010,377, which is a continuation of U.S. application Ser. No. 10/095,006, filed Mar. 12, 2002 and issued as U.S. Pat. No. 7,289,965, which claims the benefit of U.S. Provisional Patent Application No. 60/311,125, filed on Aug. 10, 2001, all of which are incorporated herein by reference in their entirities.

BACKGROUND OF THE INVENTION

I. Field of the Invention

The present invention generally relates to financial systems and to systems and methods for processing financial information. More particularly, the invention relates to systems and methods for evaluating the likelihood that an appraisal of property is faulty.

II. Background and Material Information

When an application for a mortgage loan is processed by a financial entity such as a lender, bank, mortgage bank, mortgage broker, or mortgage originator, the property securing the mortgage is usually appraised. Since various financial entities have an interest in knowing the true (or fair) market value of the property securing the mortgage, the appraisal of a property is an important part of the mortgage loan application process.

An appraisal provides a property value estimate indicating a market value for a property. The appraisal may be performed in various ways including, for example, an in-person property appraisal performed by an appraiser. During the in-person appraisal, the appraiser physically inspects the property. Without a physical inspection of the property, recent sales information for comparable properties may be used to generate an appraisal.

Alternatively, an automated valuation model serves as a tool that utilizes various factors (e.g., ZIP code, lot size, number of bedrooms, etc.) to appraise a property. Examples of automated valuation models may be found in one or more of the following applications: U.S. patent application Ser. No. 08/730,289, filed Oct. 11, 1996, entitled "METHOD FOR COMBINING HOUSE PRICE FORECASTS," U.S. patent application Ser. No. 09/115,831, filed Jul. 15, 1998, entitled "SYSTEM AND METHOD FOR PROVIDING HOUSE PRICE FORECASTS BASED ON REPEAT SALES MODEL," U.S. patent application Ser. No. 09/134,161, filed Aug. 14, 1998, entitled "SYSTEM AND METHOD FOR PROVIDING PROPERTY VALUE ESTIMATES," U.S. patent application Ser. No. 09/728,061, filed Dec. 4, 2000, entitled "METHOD FOR FORECASTING HOUSE PRICES USING A DYNAMIC ERROR CORRECTION MODEL." Other types of appraisals that provide an informed estimate of property value may also be used to appraise a property. Because of the various forms that an appraisal may take, an appraisal may be burdensome for a financial entity to process and/or interpret. For example, a financial entity may find it difficult to readily assess the reliability of an appraisal and, as a result, order an unnecessary reappraisal of the property.

A financial entity may use an appraisal to approve a mortgage loan. For example, when a borrower applies for a mortgage loan, the appraisal may be used by a bank to verify the value of the underlying property. The bank uses the property value as a factor in approving or rejecting the mortgage loan application. For example, when an appraisal indicates that a property is worth less than the mortgage amount, a bank may not be willing to accept the financial risk and will therefore reject the mortgage loan application. On the other hand, the bank may simply tell the borrower that the maximum amount borrowed cannot exceed the appraised property value, or a percentage thereof. For these and other reasons, the appraisal is usually considered an important part of the mortgage loan application process.

SUMMARY OF THE INVENTION

Accordingly, the present invention is directed to systems and methods for processing financial information and, more particularly, systems and methods for evaluating the likelihood that an appraisal of property is faulty.

A financial system consistent with the systems and methods of the present invention may provide an indication that an appraisal value for a property is likely to be faulty using a model including, for example, receiving information representative of at least one of a borrower, a property, or one or more demographics; receiving the appraisal value of the property; and determining a score based on the received information, received appraisal, and the model, such that the score provides the indication of the likelihood that the appraisal value for the property is faulty.

Additional features and advantages of the invention will be set forth in part in the description which follows and in part will be obvious from the description, or may be learned by practice of the invention. The objectives and advantages of the invention may be realized and attained by the system and method particularly described in the written description and claims hereof as well as the appended drawings.

To achieve these and other advantages and in accordance with the purpose of the invention, as embodied and broadly described herein, there is also provided a method for generating a model for providing one or more scores indicating a likelihood that an appraisal value is faulty, including, for example, receiving information representative of at least one of a borrower, a property, or one or more demographics; receiving a first appraisal value of the property; receiving a second appraisal value of the property, such that the second appraisal verifies the first appraisal; and determining one or more parameters for the model based on the received information, the received first appraisal value, and the received second appraisal value, such that the one or more parameters enable the model to provide the one or more scores.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings:

FIG. 6 illustrates exemplary information received from a lender consistent with the systems and methods of the present invention;

FIG. 7 illustrates additional information that may be received consistent with the systems and methods of the present invention;

FIG. 8 depicts an exemplary web page interface for providing information consistent with the systems and methods of the present invention;

FIG. 9 shows an exemplary model for determining an indication that an appraisal value for a property is likely to be faulty consistent with the systems and methods of the present invention;

FIG. 13 shows an exemplary table of information for determining the one or more parameters of the model consistent with the systems and methods of the present invention.

DETAILED DESCRIPTION

Figure 1:
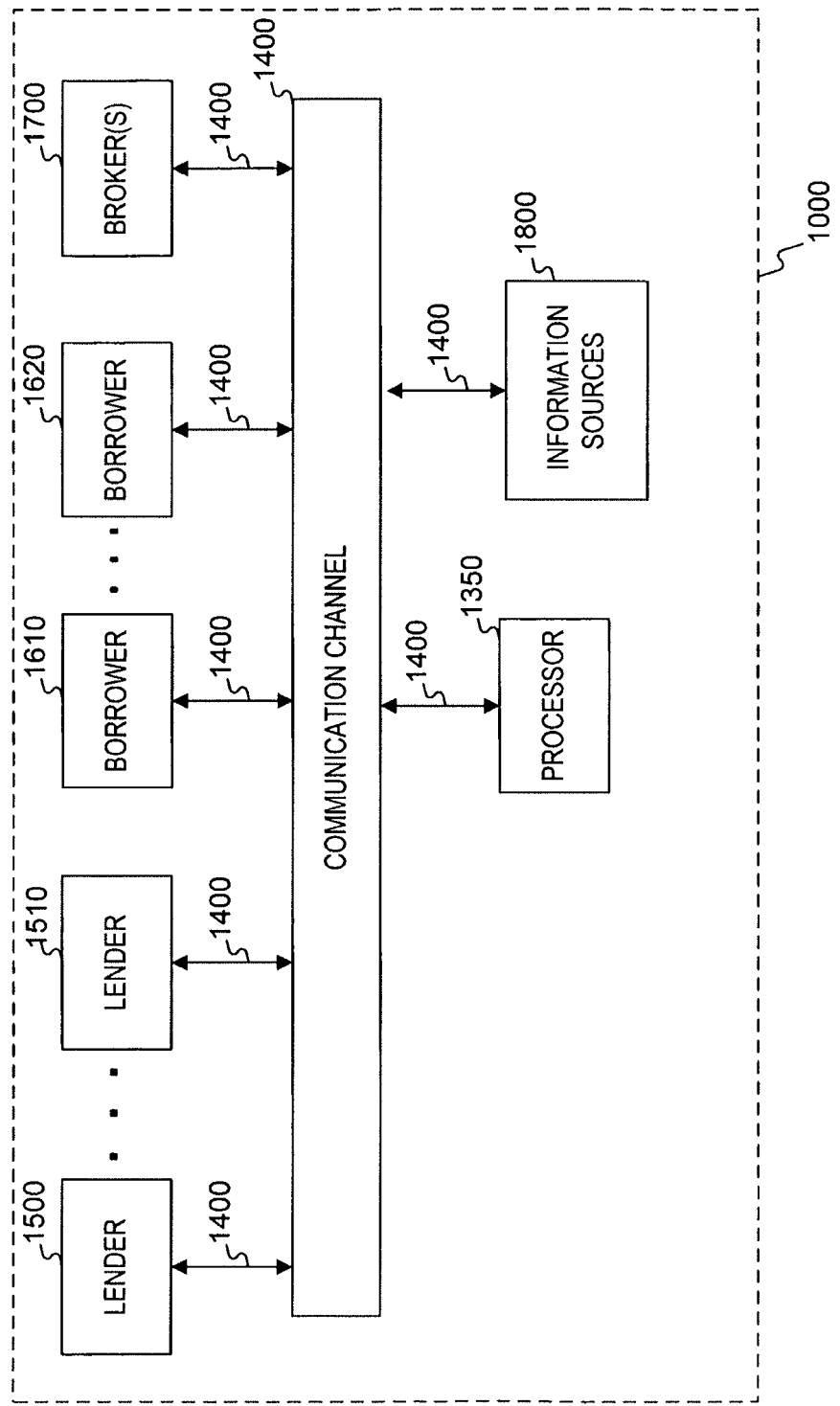
FIG. 1 illustrates an exemplary system environment in accordance with systems and methods consistent with the present invention.

Reference will now be made in detail to the invention, examples of which are illustrated in the accompanying drawings. Wherever possible, the same reference numbers will be used throughout the drawings to refer to the same or like parts.

Systems and methods consistent with the present invention permit a financial entity, using a computing platform (or computer), to determine an indication of whether a property appraisal is likely to be faulty. Moreover, the financial entity may determine such indication in the form of a score, which is referred to herein as a Home Value (HV) Score. In one aspect of the invention, the computing platform determines the HV Score based on a model and scales the score into a range (e.g., 300 to 900) with a low score indicating a high likelihood that the appraisal is faulty (i.e., the appraisal is probably "bad") and a high score indicating a low likelihood that an appraisal is faulty (i.e., the appraisal is probably "good").

By way of example only, a financial entity, such as a lender, bank, mortgage bank, mortgage broker, or mortgage originator, may process a borrower's mortgage loan application. That application may require an appraisal that is used to approve the mortgage loan application. For example, a mortgage originator may use the appraisal to determine a ratio of the loan amount to the property value (referred to as a loan-to-value ratio or LTV) with the appraisal serving as the property value. Based on the loan-to-value ratio, the mortgage originator may approve the mortgage loan. However, if the appraisal is faulty, the mortgage originator may then incorrectly approve the mortgage loan application. The mortgage originator thus has an interest in ensuring that if the appraisal is faulty, the appraisal is discounted and a "new" appraisal is performed. Accordingly, by using the HV Score, a financial entity may readily assess the reliability of a property appraisal reducing the burden associated with processing and/or interpreting the appraisal. Moreover, because the HV Score makes it easier to interpret the reliability of the appraisal, the financial entity will be less likely to misinterpret an appraisal and/or request an unnecessary reappraisal.

In addition to evaluating an appraisal associated with an individual mortgage loan secured by real property, the HV Score may be used to evaluate each appraisal in a pool of mortgage loans. By way of example only, quality control (QC) of the mortgage pool may be more accurately targeted to those mortgage loans secured by properties whose appraisals have lower HV Scores. Rather than randomly selecting mortgage loans, in the pool for QC verification of an acceptable loan-to-value ratio, a financial entity may use the HV Score to identify only those loans in the pool most likely to have an unacceptable ratio. Accordingly, the financial entity may initiate further investigation (e.g., order a "new" appraisal) only of the mortgage loans identified based on the corresponding HV Scores, reducing the financial and administrative burden on the financial entity.

FIG. 1 shows an exemplary system 1000 for providing an indication of whether an appraisal is likely to be faulty, such that the indication provides an HV Score, enabling a financial entity to readily determine the likelihood that the appraisal is likely to be faulty.

Referring to FIG. 1, the system includes a communication channel 1400, one or more lenders 1500,1510, one or more borrowers 1610, 1620, a broker 1700, one or more information sources 1800, and a processor 1350. The one or more lenders may include a financial entity, such as a bank, mortgage bank, mortgage broker, mortgage originator, and/or any other entity seeking an indication of whether an appraisal value of a property is likely to be faulty. The one or more borrowers 1610, 1620 may include an entity, such as a consumer, seeking a mortgage loan. The broker 1700 may include an entity that acts an agent, such as a mortgage broker. The information source 1800 may include internal, external, proprietary, and/or public databases, such as financial databases and demographic databases. For example, sources of information may include DataQuick Information Systems, International Data Management Inc., First American Corporation, county property and/or tax records, TransUnion LLC, Equifax Inc., Experian, Department of Commerce, and Bureau of Labor and Statistics. The processor 1350 may include an entity capable of processing information such that an HV Score is provided to, for example, a lender 1500, borrower 1610, broker 1700 and/or any other entity requesting an HV Score.

Although the communication channel 1400 is depicted in FIG. 1 as bi-directional, a skilled artisan would recognize that unidirectional communication links may be used instead.

Figure 2:
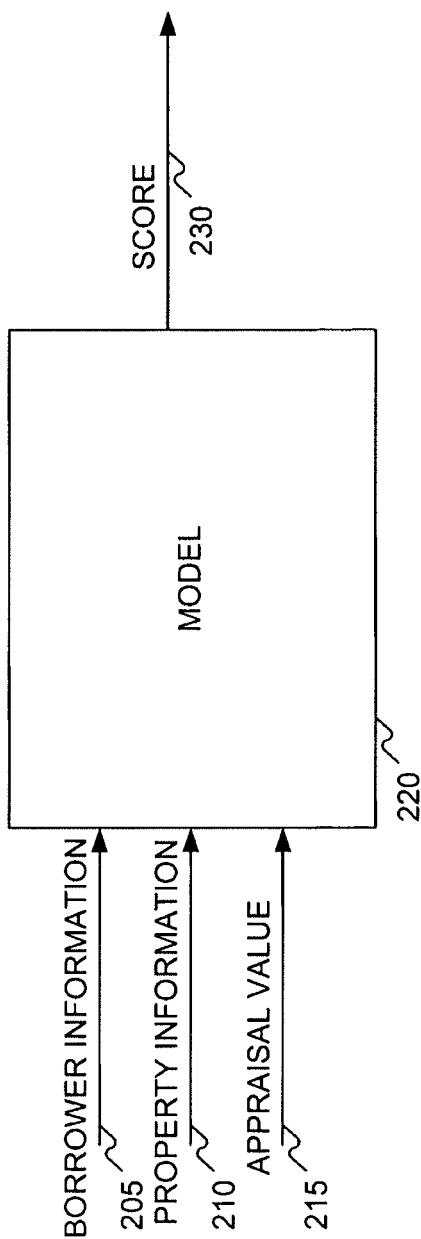
FIG. 2 is an exemplary block diagram for providing an indication that an appraisal value for a property is likely to be faulty using a model consistent with the systems and methods of the present invention.

FIG. 2 depicts a functional block diagram associated with providing an HV Score consistent with the systems and methods of the present invention. Referring to FIGS. 1 and 2, an entity, such as a lender 1500 providing a loan secured by a property, may provide the processor 1350 with information, such as information describing the borrower 205, information describing the property 210, and/or information describing the value of the property (e.g., an appraisal) 215. The processor 1350 may then use a model 220 to determine an HV Score. The processor 1350 may also provide the lender 1500 with the HV Score via a communication channel 1400.

In one aspect of the invention, the HV Score is scaled such that a low HV Score indicates that an appraisal, provided by the lender, is likely to be faulty (i.e., the property appraisal does not reflect the fair market value). On the other hand, a high HV Score indicates that an appraisal is unlikely to be faulty (i.e., the property appraisal accurately reflects the fair market value). Accordingly, the HV Score facilitates determining whether an appraisal for a property is likely to be faulty. Thus, the lender may more accurately evaluate the borrower's mortgage loan application.

Figure 3A:
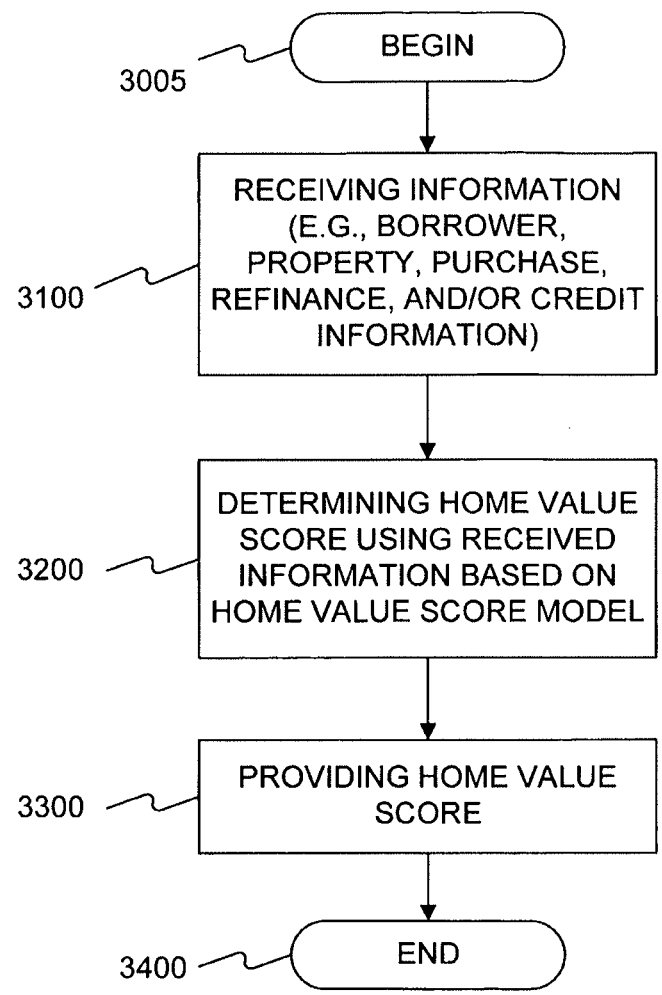
FIG. 3A is an exemplary flowchart for providing a home value score based on a model consistent with the systems and methods of the present invention.

FIG. 3A is an exemplary flowchart depicting steps for providing an HV Score. Referring to FIGS. 1 and 3A, in one embodiment, the processor 1350 may receive information (step 3100) through a communication channel 1400 from a mortgage originator, such as a lender. The received information may include, for example, information describing a borrower, a property, and an appraisal. In one aspect of the invention, the information describing the borrower may include the borrower's name, address, and credit history. Moreover, the property information describes the property and may include, for example, the address of the property securing the mortgage. Furthermore, the appraisal information provides an estimate of the property value and may include, for example, any indication of property value, such as a borrower's estimate of the property value, a lender's estimate of the property value, a purchase price, an in-person appraisal by an appraiser, and/or an automated valuation model appraisal (or estimate) of the property's value.

The processor 1350 may then determine an HV Score, using the information received from the mortgage originator, based on a model (step 3200). The processor 1350 may also provide the HV Score (step 3300) to the mortgage originator, such as lender 1500, through the communication channel 1400. The lender 1500 may then use the HV Score to determine whether the appraisal information for a property is likely to be faulty. If the appraisal is likely to be faulty, the lender may then decide to order another appraisal.

In one embodiment, the processor 1350 may scale an HV Score such that the score falls within a range, such as 300-900. Table 1 shows three exemplary HV Scores with a likelihood that an appraisal is faulty and a proposed action for the lender 1500. For example, when the processor 1350 provides an HV Score of 500 to the lender 1500, the HV Score may indicate that a property appraisal is highly likely to be unreliable (or faulty). With an HV Score of 500, the HV Score may lead a lender 1500 to conclude that a review of the appraisal is appropriate, such as requesting another appraisal (e.g., an in-person appraisal by another appraiser).

When the processor 1350 provides an HV Score of 600 to the lender 1500, the HV Score of 600 may indicate that a property appraisal is somewhat less likely to be unreliable than a score of 500. In this case, the lender 1500 may conclude that another appraisal is appropriate. However, since the HV Score is on the borderline of being reliable, the lender 1500 may simply request a less costly automated appraisal using an automated valuation model (AVM), such as Home Value Explorer[SM] (HVE). The lender 1500 may then review the output from the AVM (including recent comparable sales in the neighborhood) to determine the reasonableness of the appraisal.

When the processor 1350 provides an HV Score of 700 to the lender 1500, the HV Score of 700 may indicate that a property appraisal is likely to be more reliable than the score of 600. In this case, the lender 1500 may be confident that the property appraisal is reliable. Accordingly, the lender 1500 may conclude that a reappraisal is unnecessary.

Although Table 1 shows three FIV Scores between 500 and 700, any other range of HV Scores may be used instead including, for example, a range of HV Scores from 1 to 10 or 300 to 900. Moreover, although Table 1 shows a lower likelihood of a faulty appraisal at higher HV Scores, a skilled artisan would recognize that a lower likelihood of a faulty appraisal may be represented with lower HV Scores instead.

TABLE 1

Exemplary HV Scores

| HV SCORE FOR A PROPERTY | LIKELIHOOD OF FAULTY APPRAISAL | PROPOSED ACTION |
|---|---|---|
| 500 | High | Order a review of the appraisal |
| 600 | Medium | Order an appraisal using an automated valuation model and/or review comparable recent sales (if any) |
| 700 | Low | Do nothing |

Figure 3B:
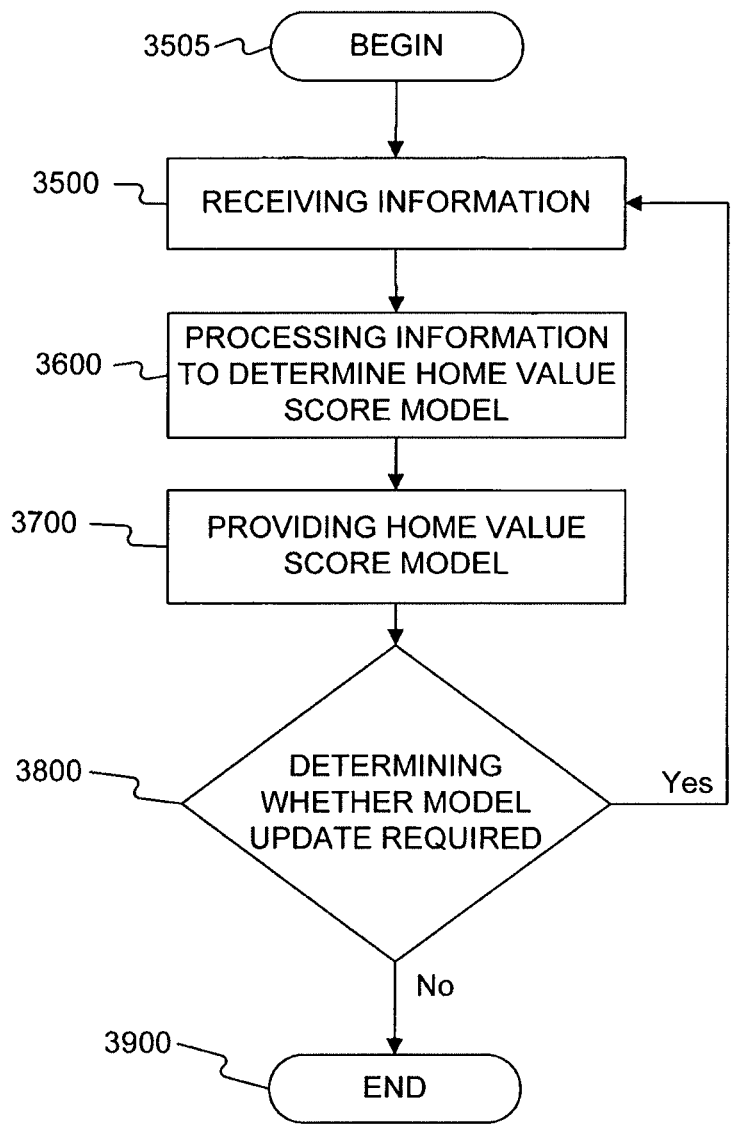
FIG. 3B is an exemplary flowchart for generating a model consistent with the systems and methods of the present invention.

FIG. 3B is an exemplary flowchart depicting steps for generating a model, such as an HV Score model, capable of providing an HV Score. Referring to FIGS. 1 and 3B, in one embodiment, the processor 1350 may begin by receiving information from various sources of information (e.g., information source 1800) to enable the processor 1350 to generate the HV Score model (step 3500). The processor 1350 may then process the received information (step 3600) to determine the coefficients (also referred to as weights) that make up the HV Score model. The processor 1350 may then provide the HV Score model to one or more entities (e.g., lenders 1500, 1510 and/or brokers 1700) to permit those entities to determine the HV Scores for appraisals. Referring again to FIG. 2, the HV Score model may thus be used as a model 220 to determine an HV Score 230. Although an HV Score model is described herein, a skilled artisan would recognize that any type of model that provides a score may be used instead.

In one aspect of the invention, the processor 1350 may periodically (e.g., yearly, monthly, etc.) update the HV Score model by providing an updated set of HV Score model coefficients (step 3800).

Figure 4:
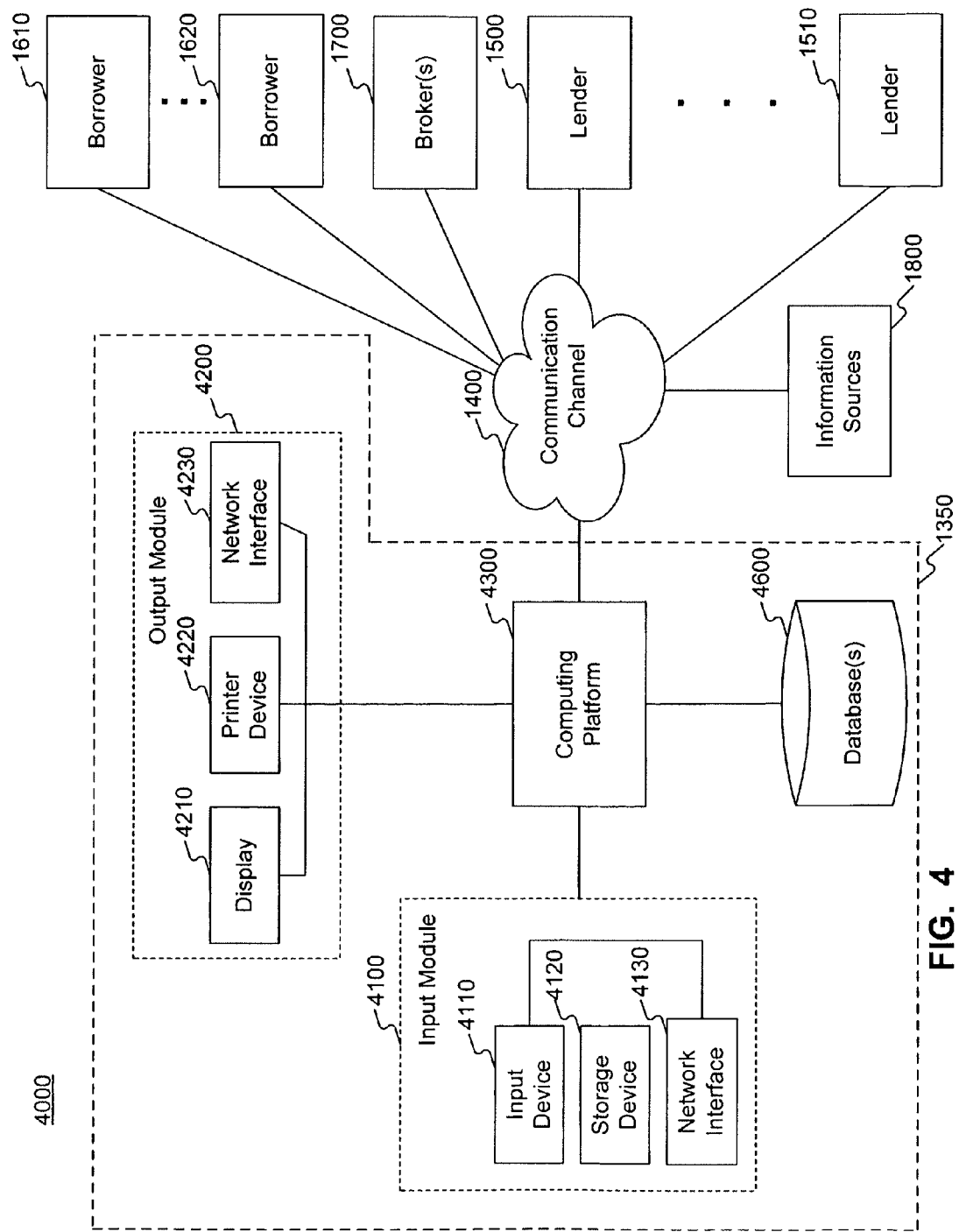
FIG. 4 illustrates another exemplary system environment in accordance with systems and methods consistent with the present invention.

FIG. 4 illustrates another exemplary system 4000 environment consistent with the systems and methods of the present invention. As illustrated in FIG. 4, the system environment 4000 includes a processor 1350, one or more lenders 1500, 1510, one or more borrowers 1610, 1620, one or more brokers 1700, one or more information sources 1800, and a communication channel 1400. The processor 1350 may also include an input module 4100, an output module 4200, a computing platform 4300, and one or more databases 4600.

In one embodiment consistent with FIG. 4, the computing platform 4300 may include a data processor such as a PC, UNIX server, or mainframe computer for performing various functions and operations. Computing platform 4300 may be implemented, for example, by a general purpose computer or data processor selectively activated or reconfigured by a stored computer program, or may be a specially constructed computing platform for carrying-out the features and operations disclosed herein. Moreover, computing platform 4300 may be implemented or provided with a wide variety of components or systems including, for example, one or more of the following: one or more central processing units, a co-processor, memory, registers, and other data processing devices and subsystems.

Communication channel 1400 may include, alone or in any suitable combination a telephony-based network, a local area network (LAN), a wide area network (WAN), a dedicated intranet, the Internet, or a wireless network. Further, any suitable combination of wired and/or wireless components and systems may be incorporated into communication channel 1400. Although the computing platform 4300 may connect to the lenders 1500, 1510 through the communication channel 1400, computing platform 4300 may connect directly to the lenders 1500, 1510.

Computing platform 4300 also communicates with input module 4100 and/or output module 4200 using connections or communication links, as illustrated in FIG. 4. Alternatively, communication between computing platform 4300 and input module 4100 or output module 4200 may be achieved using a network (not shown) similar to that described above for communication channel 1400. A skilled artisan would recognize that computing platform 4300 may be located in the same location or at a geographical separate location from input module 4100 and/or output module 4200 by using dedicated communication links or a network.

Input module 4100 may be implemented with a wide variety of devices to receive and/or provide information. Referring to FIG. 4, input module 4100 may include an input device 4110, a storage device 4120, and/or a network interface 4130. Input device 4110 may also include a keyboard, a mouse, a disk drive, telephone, or any other suitable input device for receiving and/or providing information to computing platform 4300. Although FIG. 4 only illustrates a single input module 4100, a plurality of input modules 4100 may also be used.

Storage device 4120 may be implemented with a wide variety of systems, subsystems and/or devices for providing memory or storage including, for example, one or more of the following: a read-only memory (ROM) device, a random access memory (RAM) device, a tape or disk drive, an optical storage device, a magnetic storage device, a redundant array of inexpensive disks (RAID), and/or any other device capable of providing storage and/or memory.

Network interface 4130 may exchange data between the communication channel 1400 and computing platform 4300 and may also exchange data between the input module 4100 and the computing platform 4300. In one aspect of the invention, network interface 4130 may permit a connection to at least one or more of the following networks: an Ethernet network, an Internet protocol network, a telephone network, a radio network, a cellular network, or any other network capable of being connected to input module 4100.

Output module 4200 may include a display 4210, a printer 4220, and/or a network interface 4230. The output module 4200 may be used to provide, inter alia, an HV Score to lenders 1500, 1510, provide an HV Score model to a computing platform 4300, and/or provide the HV Score model to any entity (or processor) seeking to determine an HV Score. Further, the output from computing platform 4300 may be displayed or viewed through display 4210 (e.g., a cathode ray tube or liquid crystal display) and/or printer device 4220. For example, the HV Score may be viewed on display 4210 and/or printed on printer device 4220. Although FIG. 4 only illustrates a single output module 4200, a plurality of spatially separated output modules 4200 may be used.

The printer device 4220 may provide output that includes information that summarizes multiple HV Scores. The summary information may include average HV Scores, percentage of HV Scores that fall above or below a threshold score, and/or other tabular/graphical information for summarizing multiple HV Scores. Moreover, multiple HV Scores and the corresponding summary information may also be categorized based on state, lender (or lender branch), appraiser, or other user defined categories.

Network interface 4230 exchanges data between the output module 4200 and the computing platform 4300 and/or between the computing platform 4300 and the communication channel 1400. The network interface 4230 may permit connection to at least one or more of the following networks: an Ethernet network, and Internet protocol network, a telephone network, a cellular network, a radio network, or any other network capable of being connected to output module 4200.

The database 4600 may store information including financial information, demographic information, real estate information, credit information, and other public and/or proprietary information that is kept within an entity or organization. For example, the database 4600 may store information received from the information source 1800 such as information from DataQuick Information Systems, International Data Management Inc., First American Corporation, county property and/or tax records, TransUnion LLC, Equifax Inc., Experian, Department of Commerce, and Bureau of Labor and Statistics. Although the database 4600 is shown in FIG. 4 as being located with the computing platform 4300, a skilled artisan would recognize that the database (or databases) may be located anywhere (or in multiple locations) and connected to the computing platform via direct links or networks.

Figure 5:
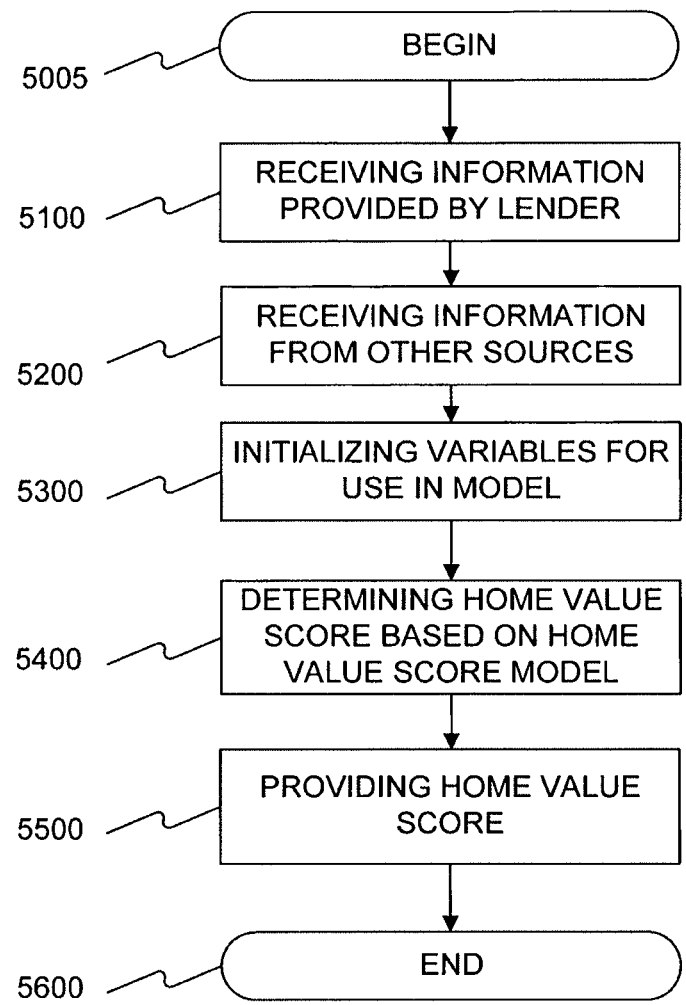
FIG. 5 is another exemplary flowchart for providing a home value score consistent with the systems and methods of the present invention.

FIG. 5 shows another exemplary flowchart with steps for providing the HV Score. Referring to FIGS. 4 and 5, the computing platform 4300 begins (step 5005) when it receives information (step 5100). For example, the computing platform 4300 may receive information provided by the lenders 1500, 1510 through the communication channel 1400. The computing platform 4300 may also receive information from other sources, such as the information source 1800 and/or database 4600 (step 5200); initialize one or more variables for use in the HV Score model (step 5300); determine the HV Score based on the HV Score model and received information (step 5400); and end when it provides the HV Score (steps 5500-5600).

To receive information provided by the lender (step 5100), the computing platform 4300 may receive from the lender, such as lender 1500, information representative of a borrower, the property, or demographic information. In one aspect of the invention, the computing platform 4300 may receive information from the lender 1500 through the communication channel 1400. This received information may include the information depicted in FIG. 6.

Referring to FIG. 6, the received information from the lender 1500 may include one or more of the following: a loan reference number; the identity of a lender; a street address of a property; the city, state, and ZIP code of the property; a stated value of the property (e.g., an appraisal provided by the borrower or the lender); an amount corresponding to the total amount borrowed or secured by the property; and information indicating whether the mortgage loan is secured by a condominium, town house, single family home, 2-4 unit dwelling, or multifamily dwelling. Moreover, the information received from the lender 1500 may include information indicating the mortgage loan type, such as whether the mortgage loan is for the purchase of a property, a mortgage refinancing, a mortgage refinancing with cash returned to the borrower (referred to as a "cash out" refinance), a home improvement loan, a debt consolidation loan, or any other type of mortgage loan. Furthermore, the received information may include an indication of the borrower's credit worthiness, such as a credit history or credit score(s); a flag indicating a source of the borrower credit information (e.g., credit information provided by a lender or a source of credit information); and/or any other information describing the borrower, the property, or demographics associated with the borrower or the property.

Moreover, the stated value of the property may correspond to an appraisal value of the property. As noted above, the appraisal value of a property may be any type of property appraisal including, for example, an in-person property appraisal, a borrower's property value estimate, a lender's property value estimate, a sales price for the property, a loan amount, an automated valuation model (AVM) appraisal (e.g., an appraisal provided by HVE).

Referring again to FIG. 5, to receive information from other sources (step 5200), the computing platform 4300 may interface with, or be embedded in, one or more systems (not shown), that provide financial information, credit information, and/or real estate information, such as systems that are used to originate loans, provide appraisals (or value property), and/or provide quality control tools for the mortgage loan process.

In one aspect of the invention, the computing platform 4300 may also interface with one or more sources of information (e.g., database 4600 and/or the information source 1800). The sources of information may provide, inter alia, median home price information for a region, borrower credit information (e.g., credit reports or credit scores), property appraisal information for one or more properties, and/or any other information that may be a factor in determining the accuracy or reliability of a property appraisal.

The sources of information may also provide the computing platform 4300 with the information listed in FIG. 7. Referring to FIG. 7, the information received by the computing platform 4300 may include one or more of the following: a borrower's credit score(s); a ZIP code with its plus 4 extension (if available) for a property; an AVM estimate, a standard deviation for the AVM estimate; and/or a value corresponding to a median price for a property in a region (listed in FIG. 7 as a "zone point value"). The region may correspond to a street, a neighborhood, a city, a ZIP code, a county, a census tract, a metropolitan statistical area, a state, and/or a country.

In one aspect of the invention, the information depicted in FIG. 6 is provided via a web-based input. FIG. 8 shows a web page for providing information to a processor 1350 (or computing platform 4300) via the communication channel 1400 (e.g., the Internet). A lender, a borrower, a broker, and/or any other entity seeking an HV Score may access the web page of FIG. 8 to provide processor 1350 (or computing platform 4300) with information. The information provided via the web page of FIG. 8 may then be used by the computing platform 4300 to determine the HV Score.

Referring again to FIG. 5, to initialize variables for use in the HV Score model (step 5300), the computing platform 4300 may initialize one or more of the variables in the HV Score model based on the information received in steps 5100 and 5200. In one embodiment, the computing platform 4300 may initialize the variables, such as the variables listed in Table 2 below.

Referring to Table 2, the computing platform 4300 may initialize one or more variables based on the received information in steps 5100-5200. For example, the computing platform may initialize the variable "CS" with a credit score received from the lender. The variable "CS 660" and "CS 760" adjusts the sensitivity of the HV Score when the variable "CS" is above 660 or 760, respectively. The variable "MCRED" may provide a flag indicating that the credit score is missing. The variable "LTV" (loan-to-value) may correspond to the ratio of the loan amount to the fair market value of the property multiplied by 100. For example, a mortgage of $100,000 on a property valued at $200,000 would have an "LTV" of 50. The variables "LTV 71," "LTV 81," and "LTV 91" adjust the sensitivity of the HV Score to the variable "LTV" when "LTV" exceeds 70, 80, or 90, respectively.

TABLE 2

Initialized Variables

CS = credit score expressed in integers, e.g. 715
CS660 = max(CS-660,0)
CS760 = max(CS-760,0)
MCRED = 1 if Credit Score is missing, otherwise 0;
LTV = total loan-to-value ratio, expressed as an integer, e.g. 80
    So (total loan amt/stated value)*100
LTV71 = max(LTV-70,0)
LTV81 = max(LTV-80,0)
LTV91 = max(LTV-90,0)
CONDO = 1 if property is Condominium, else 0
PUR = 1 if purpose is purchase, else 0
NCO = 1 if purpose is rate/term refinance, else 0
CO = 1 if purpose is cash out refinance, else 0
HIL = 1 if purpose is home improvement loan, else 0
DC = 1 if purpose is debt consolidation, else 0
OTH = 1 if purpose is other, else 0
VALSIG = (log(stated value) − log(CPV))/St dev. (Logs are natural logs)
If VALSIG > 0 then VALSIGU = VALSIG. Else VALSIGU = 0
If VALSIG < 0 then VALSIGD = VALSIG. Else VALSIGD = 0
ZONDIF = (log(stated value) − log(Zone Point Value)).
If ZONDIF > 0 then ZONDIFU = ZONDIF. Else ZONDIFU = 0
If ZONDIF < 0 then ZONDIFD = ZONDIF. Else ZONDIFD = 0
If Hedonic Point Value > 10,000 and Repeat Sales Point Value > 10,000
then NOTBOTH=0;
    ELSE NOTBOTH=1;
VSU2 = max(VALSIGU-2.0,0);

In addition, the computing platform 4300 may initialize variables based on the purpose (or type) of mortgage loan. For example, the variable "CONDO" may correspond to a flag that is a "1" when the property type is a condominium. The variable "PUR" may indicate that the mortgage purpose corresponds to a mortgage only for a property purchase (e.g., without cash out). The variable "NCO" may correspond to a "1" when the mortgage purpose corresponds to a rate/term refinancing. The variable "CO" may be set to a value of "1" when the mortgage purpose corresponds to a cash out refinance (i.e., cash returned to the borrower). The variable "HIL" may indicate that the mortgage purpose corresponds to a home improvement loan. The variable "DC" may indicate that the mortgage purpose includes a borrower's debt consolidation mortgage loan. The variable "OTH" may indicate that the mortgage purpose is unknown or other than the ones mentioned above.

The variable "VALSIG" may be determined based on the following equation:

$$VALSIG = (\log(\text{stated value}) - \log(CPV))/\text{St dev} \qquad \text{Equation 1}$$

where CPV means combined point value; where "St dev" represents the standard deviation associated with the property valuations provided by an automated valuation model (AVM), such as HVE. The variable VALSIG represents the number of standard deviations (or sigmas ($\sigma$)) between the stated value (or appraisal) of the property and the estimated value provided by the AVM. In this example, the AVM provides a property valuation estimate that is just one of the numerous factors considered when determining the HV Score.

The variables "VALSIGU" and "VALSIGD" may be determined based on the value of "VALSIG," as shown in Table 2. The value of the variable "ZONDIF" may be determined based on the following equation:

$$ZONDIF = (\log(\text{stated value}) - \log(\text{Zone Point Value})) \quad \text{Equation 2}$$

The values of variable "ZONDIFU" and "ZONDIFD" may be determined based on the value of "ZONDIF," as shown in Table 2. Further, the variable "NOTBOTH" may be set to a value of zero when two types of automated valuation models are used (e.g., using a valuation model based on repeat sales versus one based on hedonics), while "NOTBOTH" is set to a value of one when only a single type of automated valuation model is used.

The variable "VSU2" may be determined based on the value of the variable "VALSIGU," as shown in Table 2. The variable VSU2 adjusts the sensitivity of the HV Score with respect to the VALSIG value of Equation 1.

To determine the HV Score (step 5400 of FIG. 5), the computing platform 4300 may use the HV Score model to compute the HV Score. Referring again to FIG. 2A, the HV Score model, may produce an HV Score 230 based on one or more of the following: borrower information 205, property information 210, and an appraisal value 215. In one aspect of the invention, the computing platform may determine an HV Score by multiplying the initialized one or more variables from step 5300 by one or more corresponding coefficients (or weights) that are part of the HV Score model 220. Moreover, the computing platform 4300 may scale the HV Score into a predetermined range, such as the range of 300 to 900. The computing platform 4300 may then provide the scaled score as the HV Score to the lender or other entity that requested the score (step 5500).

FIG. 9 shows an exemplary model, such as an HV Score model. Referring to FIG. 9, the computing platform 4300 may determine the product of the initialized variable and corresponding model coefficient (lines 1-21). For example, computing platform 4300 would determine the product of the coefficient "−11.0280" and the initialized variable "LTV" by multiplying these two values (line 6). As illustrated in FIG. 9, the computing platform 4300 then sums all of the determined products to produce an HV Score.

Moreover, in one aspect of the invention, an HV Score is scaled into a range of 300 to 900 such that an HV Score of 300 suggests that an appraisal value received from a lender may be faulty. On the other hand, an HV Score of 900 would indicate that the appraisal value is likely to be reliable. FIG. 9 at lines 23-24 shows, that an HV Score that is less than 300 is scaled to 300 and an HV Score that is more than 900 is scaled to 900.

Figure 10:
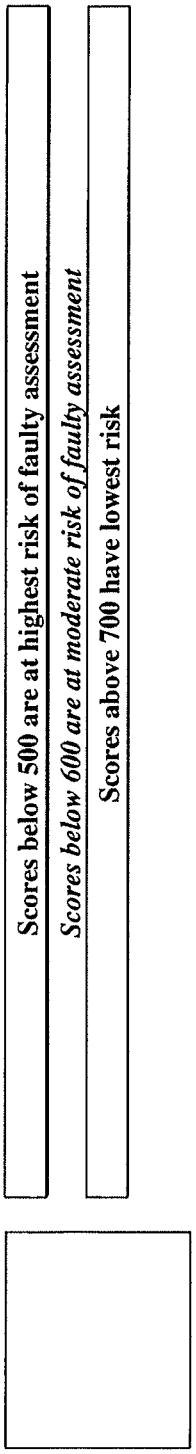
FIG. 10 depicts an exemplary web page interface for receiving an indication that an appraisal value for a property is likely to be faulty consistent with the systems and methods of the present invention.

FIG. 10 depicts an exemplary web page with an HV Score that is provided to an entity, such as lender 1500. The computing platform 4300 may provide the HV Score to the lender 1500 through the communication channel 1400. As illustrated in FIG. 10, the HV Score may provide the lender 1500 with an indication of whether the property appraisal is likely to be faulty. By way of example only, FIG. 10 depicts that an HV Score below 500 maybe considered at "highest risk" of being faulty, suggesting to the lender 1500 that a review of the appraisal may be appropriate. A review of the appraisal may include a second appraisal, such as an in-person appraisal or automated valuation model appraisal. An HV Score between 500-600 may be considered at "moderate risk" of being faulty, suggesting to the lender 1500 that it conduct a review of comparable recent home sales and/or an automated valuation model appraisal. When an HV Score is above 700, the appraisal is at "lowest risk" of being faulty, suggesting to the lender 1500 that no further review or verification of the appraisal is necessary.

Figure 11:
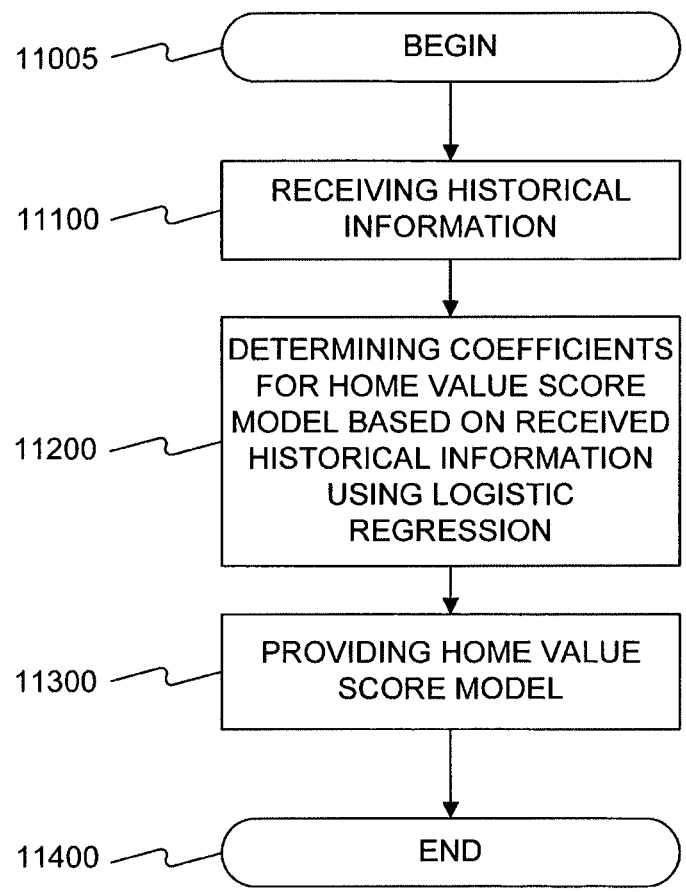
FIG. 11 is another exemplary flowchart for generating a model consistent with the systems and methods of the present invention.

In one embodiment, the computing platform 4300 may also generate the model, such as the HV Score model. FIG. 11 shows a flow chart depicting the steps associated with generating the HV Score model. The computing platform 4300 may begin by receiving historical (or truth) information (step 11100); determining one or more coefficients (or weights) for the HV Score model based on the received historical information (step 11200); and ends when it provides the HV Score model (steps 11300-11400).

The computing platform 1300 may receive historical information for one or more loans from sources of information, such as database 4600 or the information source 1800. The historical information may include borrower information, demographic information, loan information, and/or property information. Moreover, the historical information may include information that is considered reliable and, preferably, verified (e.g., "truth" data).

In one aspect of the invention, the computing platform 4300 uses appraisal information that is reliable and verified. For example, a first appraisal performed on a property may be verified by a second appraisal, such as an in-person appraisal. If a second appraisal confirms the validity of the first appraisal, the first appraisal thus serves as historical information that is reliable and verified. Although unreliable and unverified data may also be used, the quality of the HV Score model may be improved by using reliable and verified data.

In one aspect of the invention, the computing platform 4300 may also receive from a source of information (e.g., database 4600 or information source 1800) one or more of the following information that may serve as historical information: borrower credit information (e.g., credit history), a credit score, a credit card balance, a credit card limit, and a ratio of a credit card balance to a credit card limit; a borrower's mortgage loan size; a borrower's car loan size; a borrower's delinquencies, such as 30, 60, or 90-day delinquencies (e.g., past due payments on debt); a median (or average) income for a region, such as a street, a neighborhood, a city, a ZIP code, a county, a state, a country, a census tract, and/or a metropolitan statistical area; an indication of whether the borrower is a first time home buyer; a type associated with the loan, such as whether the loan is for a purchase, a refinance, or a cash-out refinance; a loan-to-value ratio for borrower's mortgage loan; a borrower's current home value; an indication of whether the mortgage loan is secured by a condominium, a single family home, a town house, a 2-4 unit dwelling, a multifamily dwelling, or a home in a planned community; a number indicating the quantity of wage earners in the borrower's household; a number indicating the quantity of residential units on a property; and/or any other information that may contribute to generating an HV Score model. Moreover, the computing platform 4300 may receive the historical information for a plurality of loans.

To determine the coefficients (step 11200), the computing platform 4300 may process the historical information received in step 11100 based on statistical techniques, such as a logistic regression. By using statistical techniques, the computing platform 4300 may determine the corresponding coefficients (or weights) of the HV Score model. Referring again to FIG. 9, the exemplary HV Score model lists coefficients including the following: 696.7000, +1.1513, +0.7011, −1.4889, +816.3115, −11.0280, +1.4715, +1.1859, −4.2848, −53.3393, −34.6074, +34.6074, −13.7633, +108.19, +67.90, +0, +0, +0, +0, −79.06, and +114.55. The computing platform 4300 thus uses a statistical technique to determine each of these coefficients.

In one embodiment, the computing platform 4300 may use a statistical technique referred to as logistic regression to determine the coefficients. Logistic regression models may be used to examine how various factors influence a binary outcome. An event (or result) that has two possible outcomes is a binary outcome (e.g., good/bad or faulty/reliable). Logistic modeling is available with many statistical software packages. For example, the commercially available statistical packages offered by SAS Institute Inc. include logistic regression modeling tools.

Figure 12:
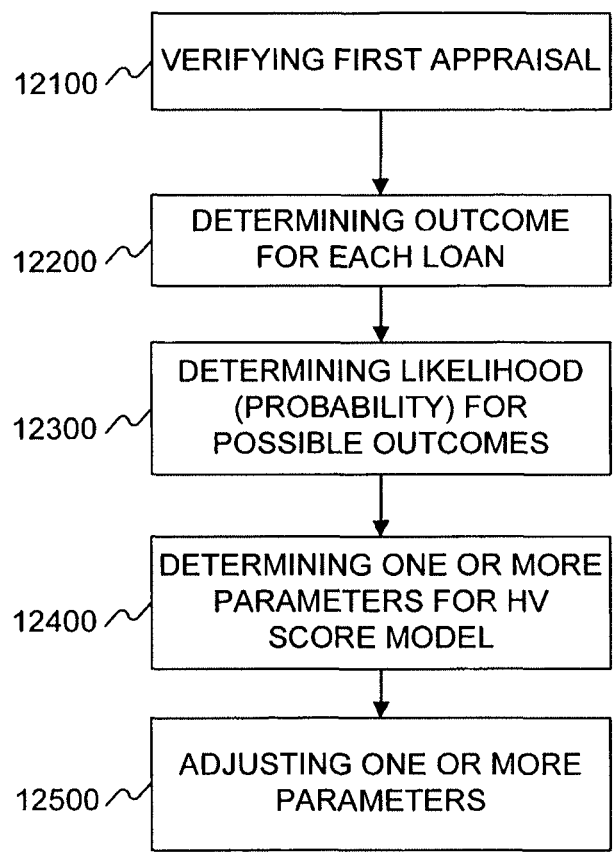
FIG. 12 is an exemplary flowchart for determining the one or more parameters (or coefficients) of the model consistent with the systems and methods of the present invention.

FIG. 12 shows an exemplary flow chart with steps for using a logistic regression approach. The logistic regression approach permits determining coefficients for the HV Score model based on historical information corresponding to one or more loans. Referring to FIG. 12, the computing platform 4300 may verify the first appraisal (step 12100); determine the outcome for each loan based on the historical information and the verification of the appraisal (step 12200); determine the likelihood (or probability) associated with each outcome (step 12300); determine one or more coefficients (or weights) for the HV Score model (step 12400); and adjust the one or more parameters by scaling the one or more coefficients (or the estimated log odds/probability) into a range (step 12500).

To verify the first appraisal (step 12100), the computing platform 4300 may compare the first appraisal with a second appraisal. Based on the comparison, the computing platform 4300 may verify whether the first appraisal is valid. For example, if the second appraisal is lower than the first appraisal, the first appraisal may be considered invalid. On the other hand, a second appraisal that is equal to or greater than the first appraisal may be considered valid. This second appraisal may be an in-person-appraisal, an AVM appraisal (or estimate), a comparison with comparable recent sales, and/or any other appraisal of the property value. FIG. 13 shows an exemplary table showing received historical information for loans with a second appraisal (shown as a "verified appraisal"). In this example, the computing platform 4300 may request a second appraisal for each of the mortgage loans listed in FIG. 13 by either requesting an in-person appraisal or requesting an AVM appraisal.

To determine the outcome for each mortgage loan (step 12200), the computing platform 4300 may compare the second appraisal to the first appraisal. If the second appraisal is lower than the first appraisal, the computing platform 4300 may set the outcome to a "1." An outcome of "1" may suggest that the first appraisal is faulty. On the other hand, if the verified appraisal is equal to or greater than the first appraisal, the computing platform 4300 may set the outcome to "0." An outcome of "0" may suggest that the first appraisal is likely to be true. Referring again to FIG. 13, the computing platform 4300 thus processes each loan to determine an outcome based on the first appraisal and the verified second appraisal, storing the information depicted in FIG. 13 in the database 4600.

FIG. 13 also depicts a loan number, a first appraisal value, a verified appraisal value, an outcome, a loan-to-value ratio, a P factor (see below), credit information (e.g., a credit score or history), a condominium flag, and a cash out refinance flag. A skilled artisan would recognize that additional information may also be received by the computing platform 4300 to determine the coefficients of the HV Score model including any other information that provides an indication of an appraisal being faulty. For example, the additional information may correspond to the variables listed in Table 2.

The loan-to-value shown in FIG. 13 is the ratio of the loan amount to the fair market value of the property multiplied by 100. The P Factor may be determined based on the following equation:

$$P \text{ Factor} = \frac{\text{LOG(appraisal value}/AVM \text{ value)}}{AVM \text{ standard deviation}} \quad \text{Equation 3}$$

where LOG represents the natural logarithm; the appraisal value represents the first appraisal; the AVM value represents an appraisal value provided by an AVM; and the AVM standard deviation represents the standard deviation of the appraisal values provided by the AVM, such as HVE.

To determine the likelihood for each of the possible outcomes (step 11300), the computing platform 4300 may further process the historical information, using a logistic regression, to determine the odds that an outcome is possible. For example, the computing platform 4300 may determine the likelihood that an appraisal value is faulty given its loan-to-value, first appraisal, verified appraisal, loan-to-value ratio, P-Factor, credit score, condominium flag, and cash out refinance flag.

In one embodiment, the computing platform 4300 uses the following equation to determine the odds, or likelihood that an outcome, such as a faulty appraisal, is possible:

$$\text{Log}(p/1-p))=a+b_1(LTV)+b_2(P \text{ Factor})+b_3(\text{Credit Score})+b_4(\text{Condo Flag})+b_5(\text{Cash Out Refinance Flag})+ \ldots b_n(n^{th} \text{ Variable}) \quad \text{Equation 4}$$

where $\text{Log}(p/(1-p))$ represents the log odds (also referred to as LOGIT) that the appraisal value is likely to be faulty; p represents the probability of a loan having a "0" outcome (or a "1" outcome); $a, b_1, b_2, \ldots, b_n$ represent the initial coefficients of the HV Score model; and n represents the number of coefficients used in the HV Score model; where $b_n$ represents the $n^{th}$ coefficient. Before the computing platform 4300 utilizes a logistic regression, the values of $a, b_1, b_2, \ldots b_n$, and p may be unknown.

In this example, the computing platform 1500 uses five coefficients (i.e., n=5) corresponding to the following five variables: LTV, P factor, credit score, condo flag, and cash out refinance flag. Although this example uses five coefficients, a skilled artisan would recognize that additional coefficients and corresponding variables may be used instead.

Although p is an unknown value at the start of the logistic regression, p may conform to the following equation:

$$p=1/(1+e) \quad \text{Equation 5}$$

where τ is the following:

$$\tau=a+b_1*LTV+b_2*P \text{ Factor}+b_3*\text{Credit Score}+b_4*\text{Condo Flag}+b_5*\text{Cash Out Refinance Flag}+b_n*\text{Other variable(s)}. \quad \text{Equation 6}$$

The computing platform 4300 may then determine an estimate of the coefficients of the HV Score model (step 12400). That is, the computing platform 4300 may solve for an estimate of $a, b_1, b_2 \ldots b_n$ using equations 4-6.

Although the computing platform 4300 may utilize a logistic regression approach as described in this example, a skilled artisan would recognize that any other approach may be used instead to determine the coefficients, such as the Probit regression approach available from SAS institute Inc., standard regression, neural networks, and any other statistical or quantitative approach that may provide coefficients based on historical information (or "truth" data).

Referring again to FIG. 12, to adjust the one or more parameters (step 12500), the computing platform 1500 may then scale the coefficients a, $b_1, b_2, \ldots b_n$. In one embodiment, the computing platform 4300 may scale the coefficients by multiplying each coefficient by the following equation:

$$\text{actual coefficient} = \text{initial coefficient} * (60/\ln(2)) \quad \text{Equation 7}$$

where ln is a natural logarithm. By using equation 7, the computing platform 1500 may scale the initial coefficients such that every 60 HV Score points doubles the odds that an appraisal is likely to be faulty. The scaled coefficients may be used as the actual coefficients used in the HV Score model, such as the HV Score model illustrated in FIG. 9. Accordingly, the computing platform 4300 may determine one or more coefficients for the HV Score model based on a logistic regression approach using historical (or "truth") information. The computing platform 4300 may then use the HV Score model to determine the HV Score.

The system 1000 may be embodied in various forms including, for example, a data processor, such as the computer that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include for example machine code, such as produced by a compiler, and files containing a high level code that can be executed by the computer using an interpreter.

Furthermore, although the embodiments above refer to processing information related to mortgage loans secured by improved real property, systems and methods consistent with the present invention may process information related to other types of loans or credit instruments, including those secured by property, such as automobiles and/or personal property. Moreover, although reference is made herein to using the HV Score to assess a residential property for a mortgage loan, in its broadest sense systems and methods consistent with the present invention may provide a score for any type of property including commercial property.

What is claimed is:

1. A computer-implemented method for determining a likelihood that an appraisal for a property is accurate, comprising:
    receiving, by a computer system, borrower information and property information;
    calculating, by the computer system based on the received borrower information and property information, a score for the appraisal of the property, the score providing an indication of the accuracy of the appraisal;
    establishing, using the computer system, a plurality of ranges within which the score may fall, each of the ranges providing a relative indication of the accuracy of the appraisal;
    analyzing, by the computer system, the score to determine within which of the plurality of ranges the score falls; and
    determining, based on the analysis of within which range the score falls, whether to request further review of the appraisal.

2. The computer-implemented method of claim 1, wherein the borrower information includes at least one of a credit score or a credit history.

3. The computer-implemented method of claim 1, wherein the plurality of ranges includes a range indicating a high likelihood that the appraisal is faulty, a range indicating a moderate likelihood that the appraisal is faulty, and a range indicating a low likelihood that the appraisal is faulty.

4. The computer-implemented method of claim 3, wherein, when the score falls in the range indicating a high likelihood that the appraisal is faulty, the method includes:
    requesting an in-person appraisal of the property.

5. The computer-implemented method of claim 3, wherein, when the score falls in the range indicating a moderate likelihood that the appraisal is faulty, the method further includes:
    requesting at least one of a review of recent comparable sales for the property or a review of the appraisal using an automated valuation tool.

6. The computer-implemented method of claim 3, wherein, when the score falls in the range indicating a low likelihood that the appraisal is faulty, the method further includes:
    not requesting further review of the appraisal.

7. The computer-implemented method of claim 1, further comprising:
    receiving, by the computer system, additional information including one or more of an amount corresponding to the total amount secured by the property, the type of property, or the mortgage loan type; and
    calculating, by the computer system, the score using the additional information.

8. A system for determining a likelihood that an appraisal for a property is accurate, comprising:
    a computer processor; and
    a memory, wherein the computer processor and the memory cooperate to:
    receive borrower information and property information;
    calculate, based on the received borrower information and property information, a score for the appraisal of the property, the score providing an indication of the accuracy of the appraisal;
    establish a plurality of ranges within which the score may fall, each of the ranges providing a relative indication of the accuracy of the appraisal;
    analyze the score to determine within which of the plurality of ranges the score falls; and
    determine, based on the analysis of within which range the score falls, whether to request further review of the appraisal.

9. The system of claim 8, wherein the borrower information includes at least one of a credit score or a credit history.

10. The system of claim 8, wherein the plurality of ranges includes a range indicating a high likelihood that the appraisal is faulty, a range indicating a moderate likelihood that the appraisal is faulty, and a range indicating a low likelihood that the appraisal is faulty.

11. The system of claim 10, wherein, when the score falls in the range indicating a high likelihood that the appraisal is faulty, an in-person appraisal of the property is requested.

12. The system of claim 10, wherein, when the score falls in the range indicating a moderate likelihood that the appraisal is faulty, at least one of a review of recent comparable sales for the property or a review of the appraisal using an automated valuation tool is requested.

13. The system of claim 10, wherein, when the score falls in the range indicating a low likelihood that the appraisal is faulty, the appraisal is accepted without requesting further review.

14. The system of claim 8, wherein the processor and the memory further:
   receive additional information including one or more of an amount corresponding to the total amount secured by the property, the type of property, or the mortgage loan type; and
   calculate the score using the additional information.

15. A non-transitory computer-readable storage medium storing a computer program for execution by a computer to determine a likelihood that an appraisal for a property is accurate, the computer program comprising:
   code that receives borrower information and property information;
   code that calculates, based on the received borrower information and property information, a score for the appraisal of the property, the score providing an indication of the accuracy of the appraisal;
   code that establishes a plurality of ranges within which the score may fall, each of the ranges providing a relative indication of the accuracy of the appraisal;
   code that analyzes the score to determine within which of the plurality of ranges the score falls; and
   code that determines, based on the analysis of within which range the score falls, whether to request further review of the appraisal.

16. The non-transitory computer-readable storage medium of claim 15, wherein the borrower information includes at least one of a credit score or a credit history.

17. The non-transitory computer-readable storage medium of claim 15, wherein the plurality of ranges includes a range indicating a high likelihood that the appraisal is faulty, a range indicating a moderate likelihood that the appraisal is faulty, and a range indicating a low likelihood that the appraisal is faulty.

18. The non-transitory computer-readable storage medium of claim 17, wherein, when the score falls in the range indicating a high likelihood that the appraisal is faulty, an in-person appraisal of the property is requested.

19. The non-transitory computer-readable storage medium of claim 17, wherein, when the score falls in the range indicating a moderate likelihood that the appraisal is faulty, at least one of a review of recent comparable sales for the property or a review of the appraisal using an automated valuation tool is requested.

20. The non-transitory computer-readable storage medium of claim 17, wherein, when the score falls in the range indicating a low likelihood that the appraisal is faulty, the appraisal is accepted without requesting further review.

21. The non-transitory computer-readable storage medium of claim 15, wherein the computer program further includes:
   code that receives additional information including one or more of an amount corresponding to the total amount secured by the property, the type of property, or the mortgage loan type; and
   code that calculates the score using the additional information.

* * * * *